United States Patent
Niemi et al.

(10) Patent No.: US 9,344,642 B2
(45) Date of Patent: May 17, 2016

(54) METHOD AND APPARATUS FOR CAPTURING A FIRST IMAGE USING A FIRST CONFIGURATION OF A CAMERA AND CAPTURING A SECOND IMAGE USING A SECOND CONFIGURATION OF A CAMERA

(75) Inventors: Sami Niemi, Skanor (SE); David Fredh, Malmo (SE)

(73) Assignee: MOBILE IMAGING IN SWEDEN AB, Lund (SE)

( * ) Notice: Subject to any disclaimer, the term of this patent is extended or adjusted under 35 U.S.C. 154(b) by 0 days.

(21) Appl. No.: 14/118,493

(22) PCT Filed: May 31, 2012

(86) PCT No.: PCT/SE2012/050584
§ 371 (c)(1),
(2), (4) Date: Feb. 14, 2014

(87) PCT Pub. No.: WO2012/166044
PCT Pub. Date: Dec. 6, 2012

(65) Prior Publication Data
US 2014/0184852 A1     Jul. 3, 2014

(30) Foreign Application Priority Data
May 31, 2011    (SE) .................................... 1150505

(51) Int. Cl.
*H04N 5/225*      (2006.01)
*H04N 5/262*      (2006.01)
(Continued)

(52) U.S. Cl.
CPC ................ *H04N 5/2621* (2013.01); *G06T 5/50* (2013.01); *H04N 5/2355* (2013.01);
(Continued)

(58) Field of Classification Search
CPC ... H04N 5/2621; H04N 5/2625; H04N 5/272; H04N 5/23232
USPC ................................................ 348/218.1, 239
See application file for complete search history.

(56) References Cited

U.S. PATENT DOCUMENTS 6,075,905 A    6/2000    Herman et al.
6,105,045 A    8/2000    Kurabayashi et al.
(Continued)

FOREIGN PATENT DOCUMENTS

EP      1 613 060 A1    1/2006
EP      1942401 A1    7/2008
(Continued)

OTHER PUBLICATIONS

International Search Report received for corresponding Patent Cooperation Treaty Application No. PCT/SE2012/050584, dated Sep. 6, 2012, 6 pages.

(Continued)

*Primary Examiner* — Kelly L Jerabek
(74) *Attorney, Agent, or Firm* — Alston & Bird LLP

(57) ABSTRACT

According to one aspect of the inventive concept there is provided a method of capturing images using a camera. The method comprises analyzing a view depicted by the digital camera and determining, based on the analysis, a subset of configurations of the digital camera. The method further comprises capturing, in response to a detection of an image capturing command at the camera, a set of at least two images using at least two different configurations of said subset of configurations.

19 Claims, 4 Drawing Sheets

(51) Int. Cl.
*H04N 5/235* (2006.01)
*G06T 5/50* (2006.01)
*H04N 5/232* (2006.01)

(52) U.S. Cl.
CPC ... *H04N 5/2356* (2013.01); *G06T 2207/20208* (2013.01); *G06T 2207/20221* (2013.01); *H04N 5/23222* (2013.01); *H04N 5/23238* (2013.01)

(56) References Cited

U.S. PATENT DOCUMENTS

| | | |
|---|---|---|
| 6,529,627 B1 | 3/2003 | Callari et al. |
| 6,542,645 B1 | 4/2003 | Silverbrook et al. |
| 6,621,524 B1* | 9/2003 | Iijima et al. ............... 348/584 |
| 6,724,386 B2 | 4/2004 | Clavadetscher |
| 6,750,903 B1 | 6/2004 | Miyatake et al. |
| 6,927,874 B1 | 8/2005 | Enokida et al. |
| 6,975,352 B2 | 12/2005 | Seeger et al. |
| 6,985,172 B1 | 1/2006 | Rigney et al. |
| 7,099,510 B2 | 8/2006 | Jones |
| 7,133,069 B2 | 11/2006 | Wallach et al. |
| 7,339,580 B2 | 3/2008 | Westerman et al. |
| 7,659,923 B1 | 2/2010 | Johnson |
| 7,787,664 B2 | 8/2010 | Luo et al. |
| 8,127,232 B2 | 2/2012 | Pavley et al. |
| 8,160,152 B2 | 4/2012 | Murayama et al. |
| 8,463,020 B1 | 6/2013 | Schuckmann et al. |
| 8,494,306 B2 | 7/2013 | Sorek et al. |
| 8,497,920 B2 | 7/2013 | Levoy et al. |
| 8,594,460 B2 | 11/2013 | Lindskog et al. |
| 2001/0020978 A1 | 9/2001 | Matsui et al. |
| 2002/0159632 A1 | 10/2002 | Chui et al. |
| 2003/0071908 A1* | 4/2003 | Sannoh et al. ............... 348/345 |
| 2003/0147000 A1 | 8/2003 | Shiraishi |
| 2003/0189647 A1 | 10/2003 | Kang |
| 2003/0190090 A1 | 10/2003 | Beeman et al. |
| 2004/0080661 A1 | 4/2004 | Afsenius et al. |
| 2004/0165788 A1 | 8/2004 | Perez et al. |
| 2004/0201699 A1 | 10/2004 | Parulski et al. |
| 2004/0223649 A1 | 11/2004 | Zacks et al. |
| 2005/0007483 A1 | 1/2005 | Zimmermann et al. |
| 2005/0031214 A1 | 2/2005 | Zhang et al. |
| 2005/0099514 A1 | 5/2005 | Cozier et al. |
| 2005/0122412 A1* | 6/2005 | Shirakawa et al. .......... 348/239 |
| 2006/0001650 A1 | 1/2006 | Robbins et al. |
| 2006/0022961 A1 | 2/2006 | Kaminaga |
| 2006/0028579 A1 | 2/2006 | Sata |
| 2006/0038908 A1 | 2/2006 | Yoshino |
| 2006/0044444 A1 | 3/2006 | Okamoto et al. |
| 2006/0061845 A1 | 3/2006 | Lin |
| 2006/0171687 A1 | 8/2006 | Aiso |
| 2006/0181614 A1 | 8/2006 | Yen et al. |
| 2006/0187321 A1 | 8/2006 | Sakamoto |
| 2007/0024721 A1 | 2/2007 | Rogers |
| 2007/0058064 A1 | 3/2007 | Hara et al. |
| 2007/0097206 A1 | 5/2007 | Houvener et al. |
| 2007/0237421 A1 | 10/2007 | Luo et al. |
| 2007/0274563 A1 | 11/2007 | Jung et al. |
| 2008/0062141 A1 | 3/2008 | Chandhri |
| 2008/0143744 A1 | 6/2008 | Agarwala |
| 2008/0152258 A1 | 6/2008 | Tulkki |
| 2008/0165141 A1 | 7/2008 | Christie |
| 2008/0218611 A1 | 9/2008 | Parulski et al. |
| 2008/0218613 A1 | 9/2008 | Janson et al. |
| 2009/0019399 A1 | 1/2009 | Matsunaga et al. |
| 2009/0046943 A1 | 2/2009 | Ishiga |
| 2009/0073285 A1 | 3/2009 | Terashima |
| 2009/0141046 A1 | 6/2009 | Rathnam et al. |
| 2009/0190803 A1 | 7/2009 | Neghina et al. |
| 2009/0204920 A1 | 8/2009 | Beverley et al. |
| 2009/0244301 A1 | 10/2009 | Border et al. |
| 2009/0245685 A1 | 10/2009 | Makii |
| 2009/0251591 A1 | 10/2009 | Whitham |
| 2009/0295830 A1 | 12/2009 | Muraveynyk et al. |
| 2009/0303338 A1 | 12/2009 | Chaurasia et al. |
| 2009/0309990 A1 | 12/2009 | Levoy et al. |
| 2009/0322926 A1 | 12/2009 | Ikeda et al. |
| 2010/0025123 A1 | 2/2010 | Lee et al. |
| 2010/0045608 A1 | 2/2010 | Lessing |
| 2010/0079498 A1 | 4/2010 | Zaman et al. |
| 2010/0149367 A1* | 6/2010 | Yim et al. ............... 348/222.1 |
| 2010/0268729 A1* | 10/2010 | Nara et al. ............... 707/769 |
| 2011/0200259 A1 | 8/2011 | Lindskog et al. |
| 2012/0262490 A1 | 10/2012 | Niemi |
| 2014/0101590 A1 | 4/2014 | Lindskob et al. |
| 2014/0177975 A1 | 6/2014 | Lindskob et al. |

FOREIGN PATENT DOCUMENTS

| | | |
|---|---|---|
| EP | 2 124 186 A1 | 11/2009 |
| EP | 2 175 635 A1 | 4/2010 |
| EP | 2 323 102 A1 | 5/2011 |
| JP | 2010 020581 A | 1/2010 |
| WO | WO 01/59709 A1 | 8/2001 |
| WO | WO 2004/068865 A1 | 8/2004 |
| WO | WO 2005/050567 A1 | 6/2005 |
| WO | WO 2007/006075 A1 | 1/2007 |
| WO | 2007038198 | 4/2007 |
| WO | WO 2008/038883 A1 | 4/2008 |
| WO | WO 2008/064349 A1 | 5/2008 |
| WO | WO 2009/156561 A1 | 12/2009 |
| WO | WO 2011/040864 A1 | 4/2011 |

OTHER PUBLICATIONS

Jiebo Luo et al. "Highly Automated Image Recomposition: The Picture You Wish You Had Taken", 2006 Western New York Image Processing Workshop, Sep. 29, 2006, Rochester Institute of Technology, Chester F. Carlson Center for Imaging Science Auditorium, Building 76, Rochester, NY 14623. Download from Internet http://citeseerx.ist.psu.edu/viewdoc/download?doi=10.1.1.102.8082 &rep=rep1&type=pdf#page=27.

Shutao Li et al. "Multifocus Image Fusion Using Region Segmentation and Spatial Frequency", ScienceDirect, Image and Vision Computing, vol. 26 (2008), pp. 971-979.

K.E. Matthews et al. "Simultaneous Motion Parameter Estimation and Image Segmentation using the EM Algorithm" , Oct. 23-26, 1995, download from internet: http://ieeexplore.ieee.org/xpl/login.jsp?reload=true&tp=&arnumber=531423 &url=http%3A%2F%2Fieeexplore.ieee.org%2Fxpls%2Fabs_all.jsp%3Farnumber%3D531423.

Itti, et al., *A Model of Saliency-based Visual Attention for Rapid Scene Analysis*, IEEE Transactions on Pattern Analysis and Machine Intelligence, vol. 20, No. 11 (1998) pp. 1254-1259.

Aseem Agarwala, et al., *Interactive Digital Photomontage*, ACM Transactions on Graphics, Aug. 1, 2004, vol. 23, No. 3, pp. 294-302; ISSN:0730-0301; XP-002359799; figure 1; abstract.

A.A.Isola, et al., *Motion compensated iterative reconstruction of a region of Interest in cardiac cone-beam CT*, Computerized Medical Imaging and Graphics, Mar. 1, 2010, vol. 34, No. 2, pp. 149-159, ISSN:0895-6111, abstract.

Shutao Li et al., *Multifocus Image Fusion Using Region Segmentation and Spatial Frequency*, Science Direct, Image and Vision Computing, vol. 26 (2008) pp. 971-979.

International Search Report/Written Opinion for Application No. PCT/SE2010/051019 dated Jan. 21, 2011.

International Search Report: mailed Jul. 20, 2010; Search Request No. ITS/SE10/00034.

Office Action for European Application No. 12 793 286.1 dated Oct. 2, 2014.

Swedish Office Action dated Jul. 20, 2010; Ref: SE-21046020.

Office Action for European Application No. 11 15 3998 dated Mar. 9, 2015.

Office Action for U.S. Appl. No. 13/026,500 dated Jul. 31, 2012.

Office Action for U.S. Appl. No. 13/026,500 dated Jan. 2, 2013.

Notice of Allowance for U.S. Appl. No. 13/026,500 dated May 21, 2013.

Notice of Allowance for U.S. Appl. No. 13/026,500 dated Jul. 24, 2013.

(56) References Cited

OTHER PUBLICATIONS

Office Action for U.S. Appl. No. 13/499,711 dated Feb. 27, 2015.
Notice of Allowance for U.S. Appl. No. 14/037,563 dated Aug. 14, 2014.
Notice of Allowance for U.S. Appl. No. 14/037,563 dated Dec. 12, 2014.
Notice of Allowance for U.S. Appl. No. 14/037,563 dated Mar. 31, 2015.
Third-Party Submission for U.S. Appl. No. 14/037,708 dated Jun. 12, 2015.
Farin et al., *Shortest Circular Paths on Planar Graphs*, 27th Symposium on Information Theory in the Benelux, Noordwijk, Netherlands (Jun. 2006) 117-124.
Ling, H. et al., *Diffusion Distance for Histogram Comparison*, IEEE Computer Society Conference on Computer Vision and Pattern Recognition, (2006) 8 pages.
Ojala, T. et al., *Multiresolution Gray-Scale and Rotation Invariant Texture Classification With Local Binary Patterns*, IEEE Transactions on Pattern Analysis and Machine Intelligence, vol. 24, No. 7 (Jul. 2002) 971-987.
Oliva, A. et al., *Modeling the Shape of the Scene: A Holistic Representation of the Spatial Envelope*, International Journal of Computer Vision 42(3), (2001) 145-175.
Wandell, B. et al., *Multiple Capture Single Image Architecture With a CMOS Sensor*, Proceedings of the International Symposium on Multispectral Imaging and Color Reproduction for Digital Archives (Society of Multispectral Imaging of Japan), (Oct. 21-22, 1999) 11-17.
Canon: "Powershot S95 Camera User Guide" [online] [retrieved Jun. 1, 2015]. Retrieved from the Internet: UR: http://gdlp01.c-wss.com/gds/4/0300003994/02/PSS95_CUG_EN_02.pdf>. (dated 2010) 196 pages.
Written Opinion for Application No. PCT/SE2012/050584 dated Sep. 6, 2012.
Supplementary European Search Report for Application No. EP 12 79 3286 dated Feb. 4, 2015.
Extended European Search Report for corresponding European Application No. 12814902.8 dated Jun. 1, 2015, 9 pages.
International Type Search Report and Written Opinion for Application No. ITS/SE10/00290 dated May 2, 2011.
International Search Report and Written Opinion for Application No. PCT/SE2012/050688 dated Oct. 26, 2012.
Office Action for Canadian Application No. 2,841,910 dated Apr. 17, 2015.
Peleg, S. et al., *Stereo Panorama With a Single Camera*, Proceedings of the 1999 IEEE Computer society conference on Computer Vision and Pattern Recognition, IEEE, vol. 1 (Jun. 1999) pp. 395-401.
Shum, H-Y. et al., *Rendering with Concentric Mosaics*, SIGGRAPH 99, ACM (1999) 299-306.
Notice of Allowance for U.S. Appl. No. 14/037,563 dated Jul. 20, 2015.
Extended European Search Report for corresponding European Application No. 11153998.7 Aug. 12, 2015, 9 pages.
Xiong, Y. et al., *Fast Panorama Stitching n Mobile Devices*, Consumer Electronics (ICCE), 2010 Digest of Technical Papers International Conference, (Jan. 2010) 319-320.
Office Action for U.S. Appl. No. 13/499,711 dated Oct. 5, 2015.
Office Action for U.S. Appl. No. 14/233,053 dated Sep. 11, 2015.
Atallah, M. J. et al., *An Optimal Algorithm for Shortest Paths on Weighted Interval and Circular-Arc Graphs, With Applications*, Algorithms ESA '93 19930930 Springer, Berlin, Heidelberg, vol. 726, pp. 13-24.
Office Action for U.S. Appl. No. 14/037,708 dated Oct. 19, 2015.
Supplementary European Search Report for Application No. EP 10 82 0903 dated Dec. 18, 2015.
Office Action for U.S. Appl. No. 13/499,711 dated Mar. 31, 2016.
Notice of Allowance for U.S. Appl. No. 14/037,708 dsted Mar. 22, 2016.
Office Action for Europran Application No. 12 793 286.1 dated Feb. 15, 2016.

\* cited by examiner

METHOD AND APPARATUS FOR CAPTURING A FIRST IMAGE USING A FIRST CONFIGURATION OF A CAMERA AND CAPTURING A SECOND IMAGE USING A SECOND CONFIGURATION OF A CAMERA

RELATED APPLICATION

This application was originally filed as PCT application No. PCT/SE2012/050584 filed May. 31, 2012, which claims priority benefit from Swedish application No. 1150505.4, filed May. 31, 2011.

FIELD OF THE INVENTIVE CONCEPT

The present inventive concept relates to methods of capturing images using a camera, and an apparatus for capturing images.

BACKGROUND

Due to the fast-paced development of consumer electronics in recent years, digital cameras are today ubiquitous. Thus, when a photo opportunity presents itself there is virtually always a camera available, e.g. in the form of a dedicated still-image camera, a dedicated video camera or a mobile phone, a smart phone or a tablet computer including a digital camera. However, photo opportunities are often instantaneous giving the photographer very little time to set-up the camera and prepare for the shot. As a result, many invaluable photo opportunities are lost even though a camera is available.

In the prior art, attempts have been made to facilitate capturing of instantaneous photo opportunities. So far these attempts have amounted to minimizing the pre-capture choices the camera user needs to make. Often little more than a single press of the camera button is required no matter the prevailing capturing conditions. Unfortunately this often results in camera settings which are sub-optimal, thereby resulting in a captured image of an unacceptable technical quality. Even worse, this may in most cases be noticed only after the image has been captured and is reviewed.

Sometimes it may be possible to "save" a captured image of low quality using various computer-aided post-processing. However, this may be time-consuming and tiresome. Additionally, post-processing may only compensate for technical errors to a limited extent. Hence some photo opportunities are still irretrievably lost. There is hence a need for methods resulting in fewer lost photo opportunities.

SUMMARY OF THE INVENTIVE CONCEPT

An objective of the present inventive concept is to meet this need in the prior art.

According to a first aspect of the inventive concept there is provided a method of capturing images using a camera. The method comprises analyzing a view depicted by the digital camera and determining, based on the analysis, a subset of configurations of the digital camera. The method further comprises capturing, in response to a detection of an image capturing command at the camera, a set of at least two images using at least two different configurations of said subset of configurations.

The inventive image capturing method enables convenient and automatic capturing of at least two images, and preferably a plurality of images, using different configurations in response to an image capturing command. By capturing the images using different configurations the user may be provided with a set of images captured at slightly different time instants with varying camera configurations. This enables a user to change timing of the capture, or the camera configuration used for the image capture, after the photo opportunity has passed. For example, the user may during the review phase, which may take place e.g. days or weeks after the photo opportunity, decide to turn on the flash or change the exposure time etc. The likelihood of capturing an image of acceptable quality, both in terms of timing and technical quality, may thus be increased compared to the prior art. Moreover, this may be obtained while minimizing the pre-capture options for the user.

Furthermore, by capturing at least two images the method enables sophisticated post processing by combining data from two or more of the at least two images in order to obtain improved composite images. This will be described in greater detail below.

The image capturing command may be a single user input image capturing command. The image capturing command may be a single actuation of an image capture actuator of the camera. The image capturing command may be an audible image capturing command input via a microphone of the camera. In response to a capturing command input by the user at least two images may thus be captured. The method hence requires a minimum of user input. Additionally, by not requiring the user to issue any further capturing command the images may be captured in rapid succession without awaiting input from the user. This enables capturing of a large number of images of the photo opportunity. The likelihood of obtaining an image with a desired timing may thus be increased.

According to one embodiment the detection of an image capturing command at the camera comprises the camera detecting a reduced movement of the camera. The camera may for example determine that a movement rate of the camera falls below a threshold level. The image capturing sequence may thus conveniently be initiated simply by the user holding the camera substantially still. As an added advantage motion blur may be reduced.

According to one embodiment the number of the set of images is proportional to a duration of the image capturing command. In case the image capturing command is a single actuation of an image capture actuator of the camera the camera may capture images as long as the actuator is depressed. The user may thus control the number of images captured.

According to one embodiment the act of determining a subset of configurations comprises determining, based on the analysis of the view, a first image capture-related parameter of the camera; determining a first subset of settings of the first capture-related parameter; and forming the subset of configurations using the first subset of settings, wherein each configuration of the subset of configurations includes a setting of the first subset of settings. The first subset of settings may include at least two different settings of the first capture-related parameter. Each configuration of the subset of configurations may thus include a different setting of a parameter. For example each configuration may include a different setting of the flash strength, a different setting of the aperture, or a different setting of the exposure etc.

The act of determining a subset of configurations may further comprise: determining, based on the analysis of the view, a second image capture-related parameter of the camera; determining a second subset of settings of the second capture-related parameter; and forming the subset of configurations using the first and second subsets of settings, wherein each configuration of the subset of configurations includes a combination of a setting of the first subset of settings and a setting of the second subset of settings. The second subset of settings may include at least two different settings of the second capture-related parameter. Images may thus be captured wherein the settings of two or more parameters are varied.

The first image capture-related parameter may be selected from the group comprising: aperture, exposure time, exposure value, ISO, flash usage, flash strength, flash synchronization speed, color settings, white balance and focus point. The second image capture-related parameter may be selected from the same group.

According to one embodiment the act of analyzing the view includes identifying at least one feature of the view. The at least one feature may include at least one of a light condition in the view, a color content of the view, and a type of the view depicted, such as a portrait, a group-portrait, a landscape, an urban environment or a moving object. The critical or sensitive capture-related parameters when capturing a night shot may be different from the critical or sensitive capture-related parameters when capturing a group portrait. Since the subset of configurations of the camera may be determined based on the actual shooting conditions and/or the context this may be taken into account.

According to one embodiment the method further comprises capturing, prior to detecting the image capturing command, at least one image of said view. Thereby images capturing the desired moment may be obtained even if the user is "too late" when issuing the image capturing command. The likelihood of obtaining an image with a desired timing may thus be increased.

The act of analyzing the view may include analyzing the at least one image captured prior to detecting the image capturing command. Thus, when the image capturing command is detected the subset of configurations to be used may already have been determined wherein any image capture lag (e.g. shutter lag) may be reduced. The at least one image captured prior to detecting the image capturing command may be provided to a viewfinder of the camera. The act of analyzing the view may thus comprise analyzing viewfinder images representing the view.

According to one embodiment the method further comprises storing the set of images in a data structure representing an image sequence. This enables convenient handling of the set of images both for the purpose of user review as well as for storage in a memory of the camera or otherwise. The data structure may for example be in the form of a video file, a slide show or the like. The data structure may be a circular buffer. The circular buffer may be arranged to store a predetermined number of images. Once the buffer has been filled the images may be sequentially replaced by more recently captured images, starting from the oldest image stored in the buffer.

In case also at least one image has been captured prior to detecting the image capturing command the method may comprise storing both the at least one image captured prior to detecting the image capturing command and the set of images in a data structure representing an image sequence.

According to one embodiment the method further comprises analyzing the set of images and determining or selecting an image of the set of images based on a set of criteria. In the following this image will be referred to as "the selected image". A "best" image (according to one or more criteria) may thus be singled out and provided to the user. The set of criteria may include one or more of image sharpness, contrast, dynamic range etc.

According to one embodiment the method further comprises discarding each image of the set of images except for the selected image. Thereby storage requirements may be reduced since only the selected image is kept.

According to one embodiment the method further comprises analyzing the set of images and determining or selecting a further image of the set of images based on a further set of criteria. In the following this image will be referred to as "the further selected image". The method may further comprise forming a composite image using the selected image and the further selected image. Thereby images of better quality may be obtained by using image data from more than one image. The selected image and the further selected image may be selected using different sets of criteria. The sets of criteria may for example result in the selection of two images which are suitable for combining in order to obtain a desired result.

According to one embodiment the selected image corresponds to an image captured using a configuration of the subset of configurations including a lower exposure value setting and the further selected image corresponds to an image captured using a configuration of the subset of configurations including a higher exposure value setting, wherein the composite image is formed to present an increased dynamic range. This enables formation of so-called High Dynamic Range-images (HDR-images). The selection and combination may be performed automatically in response to the image capturing being finished. The selection and combination may also be performed in response to an input command received from the user. For example, the user may during the review phase, which may take place e.g. days or weeks after the photo opportunity, decide to generate a HDR-image.

According to one embodiment the method further comprises: determining from the set of images, a source image and a target image; identifying a source area in the source image, the source area having a set of coordinates; using the set of coordinates for the source area to, in response to the identifying the source area, identify a target area in the target image; and forming a composite image based on image data information of the target image, wherein image data information of the target area is seamlessly replaced with image data information of the source area.

According to one embodiment the method further comprises: determining from the set of images, a source image and a target image; identifying a source area in the source image, the source area having a set of coordinates; using the set of coordinates for the source area to, in response to the identifying the source area, identify a target area in the target image; and forming a composite image based on image data information of the source image, wherein image data information of the source area is seamlessly replaced with image data information of the target area.

These two latter embodiments enable forming of a composite image based on image data information of one of the target image, wherein image data information of the target area is seamlessly replaced with image data information of the source area, or the source image, wherein image data information of the source area is seamlessly replaced with image data information of the target area.

These methods thus allow areas of images to be seamlessly replaced. This enables areas of imperfections to be seamlessly replaced with areas from other images. For example, an area of an image depicting human beings with closed eyes may be replaced with a corresponding area from another (similar) image wherein the eyes of the (same) human being is open, inter alia by allowing a user to replace parts of an image with the same area from other images. The source image may correspond to the above-mentioned selected image and the target image may correspond to the above-mentioned further selected image, or vice versa.

According to one embodiment the set of images are captured such that, for each configuration of the subset of configurations, the set of images includes at least one image captured using said configuration.

According to a second aspect of the present inventive concept there is provided a method of capturing images using a camera. The method comprises: analyzing a view depicted by the camera; determining, based on the analysis of said view, a first configuration of the camera; and capturing, in response to a detection of an image capturing command at the camera, a first image of a view using the first configuration. The method further comprises: analyzing the first image; determining, based on said analysis of the first image, a second configuration of the digital camera; and capturing a second image using the second configuration.

The advantages discussed in connection with the first aspect apply correspondingly to the second aspect wherein reference is made to discussion above. The second aspect provides the additional advantage that the configurations may be determined gradually during the image capturing act. Thereby, the method may take into account changes occurring between the capturing of images. Additionally, since only one configuration needs to be determined before capturing the first image capture lag may be minimized.

The method may further comprise analyzing the second image; determining, based on the analysis of the second image, a third configuration of the digital camera; and capturing a third image using the third configuration. This process may be repeated to capture even further images. The first and second images and, if applicable, third and further images form a set of captured images.

According to one embodiment determining the first configuration comprises: determining, based on the analysis of the view depicted by the camera, a first image capture-related parameter of the camera, and determining a first setting of the first capture-related parameter. Moreover, determining the second configuration comprises: determining, based on the analysis of the first image, a second image capture-related parameter of the camera, and determining a first setting of the second capture-related parameter. Thus, the first image is captured using the first setting of the first capture-related parameter and the second image is captured using the first setting of the second capture-related parameter.

The first and the second capture-related parameters may be the same parameter, wherein the said first settings of the first and second capture-related parameters are two different settings of the same determined capture-related parameter. Alternatively, the first and the second capture-related parameters may be different parameters.

The image capturing command may be a single user input image capturing command. The image capturing command may be a single actuation of an image capture actuator of the camera. Alternatively, the image capturing command may be an audible image capturing command input via a microphone of the camera. Thus in response to a capturing command input by the user at least two images may be captured. The method thus requires a minimum of user input. Additionally, by not requiring the user to issue any further capturing command the images may be captured in rapid succession without awaiting input from the user. This enables capturing of a large number of images of the photo opportunity. The likelihood of obtaining an image with a desired timing may thus be increased.

According to one embodiment the detection of an image capturing command at the camera comprises the camera detecting a reduced movement of the camera. The camera may for example determine that a movement rate of the camera falls below a threshold level. The image capturing sequence may thus conveniently be initiated simply by the user holding the camera substantially still. As an added advantage motion blur may be reduced.

According to one embodiment the number of the set of images is proportional to a duration of the image capturing command. In case the image capturing command is a single actuation of an image capture actuator of the camera the camera may capture images as long as the actuator is depressed. The user may thus control the number of images captured.

According to one embodiment the first and second image capture-related parameters are selected from the group comprising: aperture, exposure time, exposure compensation, ISO, flash usage, flash strength, flash synchronization speed, color settings, white balance and focus point.

According to one embodiment the act of analyzing the view depicted by the camera includes identifying at least one feature of the view and the act of analyzing the first image includes identifying at least one feature of the first image. The identified features may include at least one of a light condition in the view, a color content of the view, or a type of the view depicted, such as a portrait, a group-portrait, a landscape, an urban environment or a moving object. The critical or sensitive capture-related parameters when capturing a night shot may be different from the critical or sensitive capture-related parameters when capturing a group portrait. This embodiment takes this into account in that the configurations of the camera may be determined based on the actual shooting conditions and/or the context.

According to one embodiment the method further comprises capturing, prior to detecting the image capturing command, at least one image of said view. Thereby images capturing the desired moment may be obtained even if the user is "too late" when issuing the image capturing command. The likelihood of obtaining an image with a desired timing may thus be increased.

The act of analyzing the view may include analyzing the at least one image captured prior to detecting the image capturing command. Thus, when the image capturing command is detected the subset of configurations to be used may already have been determined wherein any capture lag (e.g. shutter lag) may be reduced. The at least one image captured prior to detecting the image capturing command may be provided to a viewfinder of the camera. The act of analyzing the view may thus comprise analyzing viewfinder images depicting the view.

According to one embodiment the method further comprises storing the set of captured images in a data structure representing an image sequence. This enables convenient handling to set of images both for the purpose of user review and storage in a memory of the camera or otherwise. The data structure may for example be in the form of a video file, a slide show or the like.

In case also at least one image has been captured prior to detecting the image capturing command the method may comprise comprising storing both the at least one image captured prior to detecting the image capturing command and the set of captured images in a data structure representing an image sequence.

According to one embodiment the method further comprises analyzing the set of captured images and determining or selecting an image of the set of captured images based on a set of criteria. In the following this image will be referred to as "the selected image". A "best" image (according to one or more criteria) may thus be singled out and provided to the user. The set of criteria may include one or more of image sharpness, contrast, dynamic range etc.

According to one embodiment the method further comprises discarding each image of the set of captured images except for the selected image. Thereby storage requirements may be reduced since only the selected image is kept.

According to one embodiment the method further comprises analyzing the set of images and determining or selecting a further image of the set of images based on a further set of criteria. In the following this image will be referred to as "the further selected image". The method may further comprise forming a composite image using the selected image and the further selected image. Thereby images of better quality may be obtained by using image data from more than one image. The selected image and the further selected image may be selected using different sets of criteria. The sets of criteria may for example result in the selection of two images which are suitable for combining in order to obtain a desired result.

According to one embodiment the selected image corresponds to an image captured using a configuration of the subset of configurations including a lower exposure value setting and the further selected image corresponds to an image captured using a configuration of the subset of configurations including a higher exposure value setting, wherein the composite image is formed to present an increased dynamic range. This enables formation of so-called High Dynamic Range-images (HDR-images). The selection and combination may be performed automatically in response to the image capturing being finished. The selection and combination may also be performed in response to an input command received from the user. For example, the user may during the review phase, which may take place e.g. a week after the photo opportunity, decide to generate a HDR-image.

According to one embodiment the method further comprises: determining from the set of images, a source image and a target image; identifying a source area in the source image, the source area having a set of coordinates; using the set of coordinates for the source area to, in response to the identifying the source area, identify a target area in the target image; and forming a composite image based on image data information of the target image, wherein image data information of the target area is seamlessly replaced with image data information of the source area.

According to one embodiment the method further comprises: determining from the set of images, a source image and a target image; identifying a source area in the source image, the source area having a set of coordinates; using the set of coordinates for the source area to, in response to the identifying the source area, identify a target area in the target image; and forming a composite image based on image data information of the source image, wherein image data information of the source area is seamlessly replaced with image data information of the target area.

These two latter embodiments enable forming of a composite image based on image data information of one of the target image, wherein image data information of the target area is seamlessly replaced with image data information of the source area, or the source image, wherein image data information of the source area is seamlessly replaced with image data information of the target area.

These methods thus allow areas of images to be seamlessly replaced. This enables areas of imperfections to be seamlessly replaced with areas from other images. For example, an area of an image depicting human beings with closed eyes may be replaced with a corresponding area from another (similar) image wherein the eyes of the (same) human being is open, inter alia by allowing a user to replace parts of an image with the same area from other images. The source image may relate to the above-mentioned selected image and the target image may relate to the above-mentioned further selected image, or vice versa.

According to a third aspect of the present inventive concept there is provided a camera configured to perform the method of the first and/or second aspect. The camera may further be configured to perform any of the above-mentioned specific embodiments of the first and second aspect. The camera may include image capturing means for capturing the images. The image capturing means may be an image capturing device configured to capture the images. The camera may include processing means for analyzing the view and/or the captured images. The camera may include processing means for determining the (subset of) configurations of the camera. The processing means may be a processor configured to analyze the view and/or the captured images and determine the (subset of) configurations of the camera. The camera may include means for receiving an image capturing command. The means may be an input device configured to receive a user input image capturing command. The camera may include storage means for storing captured images. The memory means may be a memory configured to store captured images.

According to a fourth aspect of the present inventive concept there is provided a computer program product comprising software instructions that when downloaded to a camera is configured to perform the method of the first and/or second aspect. The computer program product may further comprise software instructions that when downloaded to a camera is configured to perform any of the above-mentioned specific embodiments of the first and second aspect. The computer program product may be provided in a computer-readable storage medium.

The third and fourth aspects may generally present the same or corresponding advantages as the first and second aspects.

According to a fifth aspect of the present inventive concept there is provided an apparatus for capturing images, comprising: means for analyzing a capturing condition such as a time of day, a geographical position of the apparatus, an orientation of the apparatus, a sound condition, a movement condition, a type of image capturing command being input, a feature of the view; means for determining, based on the analysis, a subset of configurations of the digital camera; and means for capturing, in response to a detection of an image capturing command at the camera, a set of at least two images using at least two different configurations of said subset of configurations.

The fifth aspect may generally present the same or corresponding advantages as the above discussed aspects.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein.

DETAILED DESCRIPTION OF PREFERRED EMBODIMENTS

Detailed embodiments of aspects of the present inventive concept will now be described with reference to the drawings.

Figure 1:
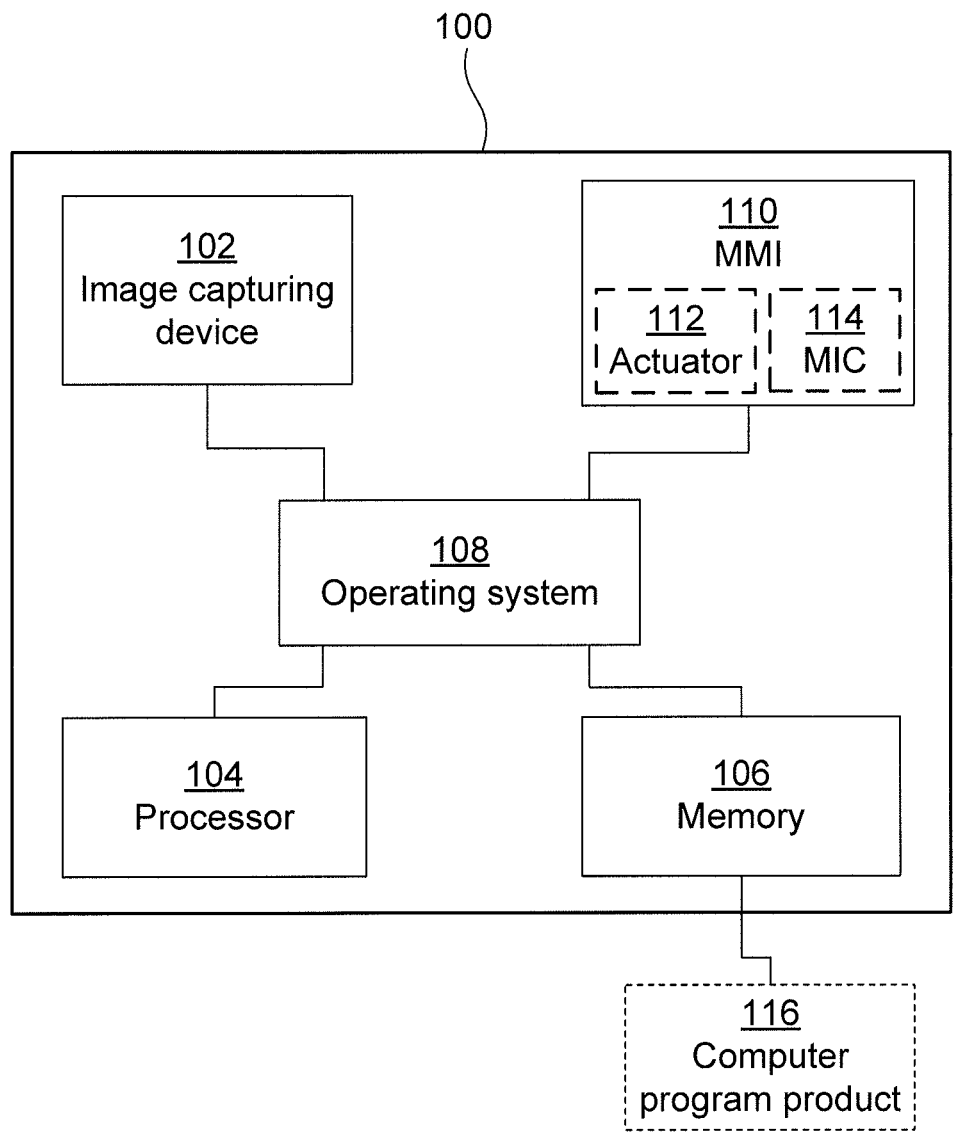
FIG. 1 is a schematic illustration of a camera according to an embodiment.

FIG. 1 is a schematic illustration of a camera 100 according to an embodiment. The camera 100 may be a digital camera such as a dedicated still-image camera or a dedicated video camera. The camera 100 may also be a personal digital assistant (PDA), a mobile phone, a smart phone or a tablet computer including camera functionality. In fact, the camera 100 may be any kind of apparatus capable of capturing images.

The camera 100 comprises image capturing means. In FIG. 1, the image capturing means is embodied by an image capturing device 102. The image capturing device 102 may include an image sensor and a lens. The image sensor may be e.g. a Charge-Coupled Device (a CCD) or a CMOS chip. The lens may be lens of fixed or variable focal length. The image capturing device 102 may further include a storage buffer for storing image data collected by the image sensor.

The camera 100 comprises processing means. In FIG. 1, the processing means is embodied by a processor 104. The processor 104 may be configured to implement the methods in accordance with the present inventive concept as will be described in detail in the following.

The processor 104 may be implemented as one or more field programmable gate arrays (FPGAs), applications specified integrated circuits (ASICs), or the like, wherein the methods of the present inventive concept may be implemented using a hardware description language (HDL). The processor 104 may also be implemented as central processing unit (CPU) of the camera 100, a graphics processing unit (GPU) of the camera 100 or a dedicated image processing unit of the camera 100 configured to implement methods in accordance with the present inventive concept, wherein the methods of the present inventive concept may be implemented using low- or high-level software instructions stored in the camera 100 for execution by the processing unit. Advantageously, the image sensor is capable of capturing and the processor 104 is capable of processing high-resolution images at a relatively high frame rate. As a non-limiting example the image sensor may be the MT9E013D00STC and the image processor may be the CCS8140 both obtainable from Aptima Imaging Corporation. These components are capable of operating at a frame rate of 15 fps at 8 Mp resolution.

The camera 100 comprises storage means. In FIG. 1 the storage means is embodied by a memory 106. The memory may include a data section for storing image data generated by the image capturing device 102. The data memory may be e.g. a random access memory (RAM) integrated in the camera 100 or a flash memory provided on a memory card removably inserted in the apparatus 100. The memory 106 may further include a program memory for storing software instructions for the processor 104. The program section may e.g. be a RAM or a ROM integrated in the camera 100.

The camera 100 and the components thereof operate under the supervision of an operating system 108. The operating system 108 may be stored in the memory 106 or in another dedicated memory.

The camera 100 comprises input means. In FIG. 1 the input means is embodied by a man-machine interface 110. The man-machine interface 110 may include one or more actuators, such as an image capture actuator 112. The actuators may be provided in the form of physical buttons or as virtual buttons presented on a touch-sensitive display of the apparatus 100. The interface 110 may also include a microphone 114 for receiving audible user commands.

The methods of the present inventive concept may also be implemented as a computer program product 116 comprising one or more software components. The software components may comprise software instructions that when downloaded to a camera are configured to perform the instructions corresponding to the methods.

Figure 2:
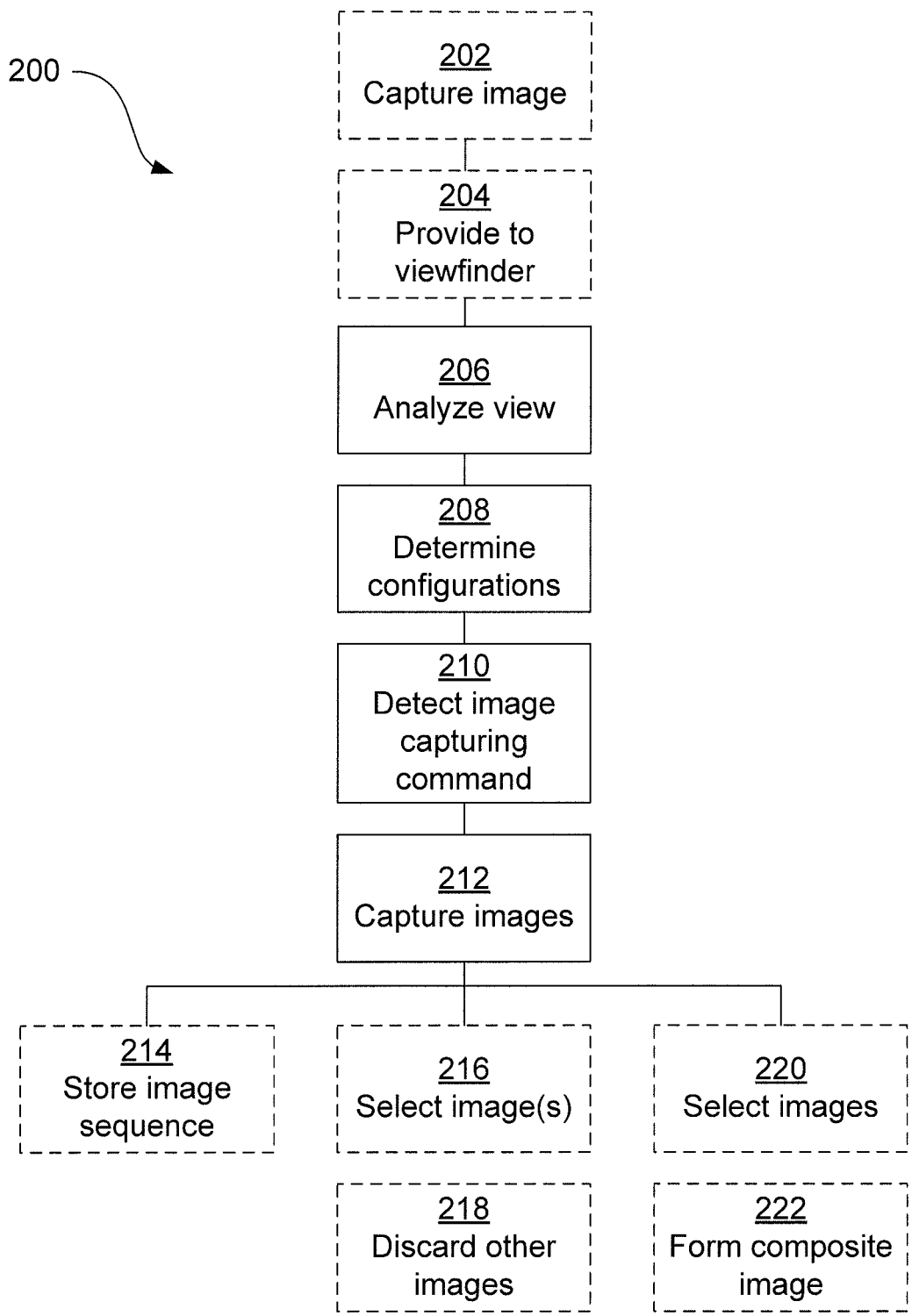
FIG. 2 is a flow chart of an embodiment of a method in accordance with a first aspect of the present inventive concept.

An embodiment of a method 200 in accordance with a first aspect will now be described with reference to FIGS. 1 and 2. The user of the camera points the camera 100 towards a desired view. The image capturing device 102 depicts the view by recording the light incident on the image sensor to generate image data. The image data may be stored in the storage buffer of the image capturing device 102. The image capturing device 102 may continually record the incident light wherein a stream of image data representing a sequence of images may be generated and stored in the storage buffer. The image sequence may be stored in a FIFO data structure or circular buffer wherein, when the data structure has been filled; the images are sequentially overwritten starting from the oldest recorded image.

All or a subset of the images may optionally be provided to a viewfinder (e.g. a display, an electronic viewfinder (EVF) or the like) of the camera 100, thereby allowing the user to preview and compose the view. To reduce the processing requirements during this stage, the image sequence may be a sequence of images of lower than the maximum quality and/or resolution supported by the image capturing device 102. This may also reduce lag in the update of the viewfinder.

The processor 104 analyzes the depicted view (box 206). The operating system 108 may provide access for the processor 104 to the images stored in the storage buffer of the image capturing device 102 wherein the processor 104 may process one or more of the images therein. The processor 104 may be configured to identify at least one feature of the view. As will be described in greater detail below, the at least one feature may relate to a light condition in the view, a color content of the view, a light condition, or a type of the view depicted, such as a portrait, a group-portrait, a landscape, an urban environment or a moving object, etc.

The view may also be analyzed in other ways. For example, the view may be analyzed using an auxiliary light sensor. The light sensor may provide a measurement of the light condition of the view and provide the measurement to the processor 104. The processor 104 may use the measurement for subsequent processing as will be described in detail below.

Based on the analysis, the processor 104 may determine a suitable base configuration for the camera 100. A configuration of the camera 100 may include a combination of specific settings of capture-related parameters of the camera 100. For example, the processor 104 may determine a suitable combination of an aperture setting and exposure time for the camera by repeatedly analyzing the images recorded in the storage buffer of the image capturing device 102. This may achieved using any of the automatic exposure methods well-known in the art. The processor 104 may control the image capturing device 102 to use the determined base configuration while recording the incident light. The processor 104 may repeatedly re-evaluate the base configuration to ensure that the images of the sequence generated by the image capturing device 102 are correctly exposed. The base configuration may include settings of further parameters such as focal point, white balance etc.

Based on the analysis, the processor 104 may also determine a subset of configurations for the camera 100. The subset of configurations may include two or more configurations, each including a combination of specific settings of capture-related parameters of the camera 100.

The specific capture-related parameters available may be different for different cameras. As an example, the capture-related parameters of a camera 100 may be aperture, exposure time, exposure value, flash usage, flash strength, flash synchronization speed, color settings, white balance, focus point and exposure index rating (EI or ISO). Assuming by way of example that the camera 100 has the five capture-related parameters of ISO, aperture (A), exposure time (S), flash (F) and flash strength (FV); a configuration of the camera 100 may be denoted $\{ISO_{i1}, A_{i2}, S_{i3}, F_{i4}, FV_{i5}\}$ where $ISO_{i1}$ denotes a specific ISO setting, $A_{i2}$ denotes a specific aperture setting, $S_{i3}$ denotes a specific exposure time setting, $F_{i4}$ denotes flash setting (e.g. on or off), and $FV_{i5}$ denotes the flash strength setting.

The subset of configurations determined based on the analysis may comprise different settings for one or more parameters. As a comparatively basic example, in case the identified feature relates to a light condition of the view and the processor 104 determines that there is strong backlighting, the processor 104 may be determine a subset of configurations wherein only the setting of one parameter, the flash strength, is varied since flash strength may be a critical parameter for obtaining technically acceptable shots in such conditions. The determined subset of configurations may include the configurations:

{ISO=400, A=3.2, S=1/1000, F=on, FV=standard}
{ISO=400, A=3.2, S=1/1000, F=on, FV=high}, and
{ISO=400, A=3.2, S=1/1000, F=on, FV=low}.

According to a more elaborate example, the processor 104 may determine a subset of configurations wherein the settings of two parameters are varied. In case the identified feature is a moving object the two parameters may be ISO and exposure time since they may be critical parameters for obtaining sharp images of moving objects. The determined subset of configurations may include the configurations:

{ISO=400, A=2.8, S=1/200, F=off, FV=N/A}
{ISO=800, A=2.8, S=1/400, F=off, FV=N/A}
{ISO=1600, A=2.8, S=1/800, F=off, FV=N/A}, and
{ISO=3200, A=2.8, S=1/1600, F=off, FV=N/A}.

According to an even more elaborate example, the processor 104 may determine a subset of configurations wherein the settings of four parameters are varied:

{ISO=400, A=2.8, S=1/200, F=on, FV=high}
{ISO=800, A=2.8, S=1/400, F=on, FV=standard}
{ISO=1600, A=2.8, S=1/800, F=on, FV=low}, and
{ISO=3200, A=2.8, S=1/1600, F=off, FV=N/A}.

The processor 104 may select the settings for each parameter separately and then form configurations by combining the determined settings of one parameter with one or more of the determined settings of the second parameter. For the example given above, the processor 104 may first determine that the applicable settings of the parameter ISO are 400, 800, 1600 and 3200. The processor 104 may then determine that the applicable settings of the parameter S are 1/200, 1/400, 1/800 and 1/1600. Finally the processor 104 may determine the subset of configurations above by combining ISO=400 with S=1/200, ISO=800 with S=1/400 etc.

Alternatively, the processor 104 may select the setting for a parameter in combination with the setting of the other parameters. For the example given above, the processor 104 may determine that a first applicable configuration includes the setting 400 of the parameter ISO and the setting 1/200 of the parameter S. The processor 104 may further determine that a second applicable configuration includes the setting 800 of the parameter ISO and the setting 1/400 of the parameter S. The processor 104 may proceed analogously to determine the further configurations and thereby determine the subset of configurations.

The present inventive concept is not limited to subsets of configurations involving different settings of one, two or four parameters but is equally applicable to subsets of configurations involving different settings of any number of parameters.

The processor 104 may repeatedly determine subsets of configurations in accordance with the above while the user directs the camera and the view, and thus the features of the view changes. For example, the processor 104 may be configured to analyze one or more of the last images recorded by the image capturing device 102 every $10^{th}$ of a second, every half of a second, every other second etc.

Once the user has directed the camera 100 towards the desired view the user may issue an image capturing command. The image capturing command is detected by the camera 100 (box 210). The user may e.g. press the actuator 112 of the camera 100 once. In case the camera 100 includes a microphone 114 the user may speak an audible capturing command into the microphone which command may be interpreted and recognized by the processor 104 as an image capturing command. Alternatively, the image capturing command may be issued simply by the user holding the camera 100 substantially still, wherein the camera may detect that the amount of movement of the camera falls below a predetermined threshold level. The detection may be achieved by the processor 104 repeatedly comparing at least the two latest images recorded in the storage buffer of the image capturing device 102. Alternatively, or additionally, the camera 100 may include a sensor such as an accelerometer, a gyroscope, a compass or the like and determine a movement of the camera using the output of the sensor.

In response to the detection of the image capturing command the processor 104 controls the image capturing device 102 of the camera 100 to capture at least two images using at least two different configurations of the subset of configurations determined by the processor 104 (box 212).

For the basic example of configurations given above the camera 100 may capture three images; one image using the configuration {ISO=400, A=3.2, S=1/1000, F=on, FV=standard}, one image using the configuration {ISO=400, A=3.2, S=1/1000, F=on, FV=high}, and one image using the configuration {ISO=400, A=3.2, S=1/1000, F=on, FV=low}.

For the more elaborate example of configurations given above the camera 100 may capture four images; one image using the configuration {ISO=400, A=2.8, S=1/200, F=off, FV=N/A}, one image using the configuration {ISO=800, A=2.8, S=1/400, F=off, FV=N/A}, one image using the configuration {ISO=1600, A=2.8, S=1/800, F=off, FV=N/A}, and one image using the configuration {ISO=3200, A=2.8, S=1/1600, F=off, FV=N/A}.

As mentioned above, the processor 104 may repeatedly determine subsets of configurations. The images captured in response to the image capturing command may then be captured using the most recent subset of configurations. The processor 104 may also be configured to determine the subset of configurations in response to detecting the image capturing command wherein the images may be captured using that subset of configurations.

The number of images captured in response to the image capturing command need not be equal to the number of configurations in the subset but may be fewer than the number of configurations or more than the number of configurations.

According to one embodiment the camera 100 may capture more than one image using a configuration of the determined subset of configurations. The camera 100 may determine a plurality of configurations $C_1, \ldots, C_N$, ($N \geq 2$). In response to receiving an image capturing command, the camera 100 may capture a first image $I_1$ using configuration $C_1$, a second image $I_2$ using configuration $C_2$, up to an Nth image $I_N$ using configuration $C_N$. Thereafter, the camera 100 may reuse configurations and thus capture an image $I_{N+1}$ using configuration $C_1$, an image $I_{N+2}$ using configuration $C_2$, up to an image $I_{2n}$ using configuration $C_N$. This reuse may be repeated a plurality of times. By way of example $C_1$ may include a first exposure value setting, $C_2$ may include a second exposure value setting which is lower than the first exposure value and no flash, and so on until $C_N$ which may include an Nth exposure value setting being the lowest exposure value setting of the subset of configurations. One or more of the configurations $C_i, \ldots, C_N$ ($2 \leq i \leq N$) may include the use of flash. By reusing configurations the likelihood of obtaining a technically acceptable image, both in terms of timing and setting, may be increased.

The image capturing may be stopped after a predetermined number of images have been captured or in response to the camera detecting a change in the view. The change may be the result of the user having changed the direction between image captures. It may also be the result of the objects in the view changing position. The change may be determined by comparing an earlier captured image (e.g. the first captured image) to a more recently captured image. The comparison may be based on a pixel-by-pixel or sub block-by-sub block basis. The comparison may be performed by correlating an earlier captured image with a more recently captured image. If the change exceeds a threshold, it may be determined that no further images are to be captured.

According to one embodiment the camera 100 is configured to capture a number of images which is proportional to a duration of the image capturing command. As long as the user actuates the actuator 112 the processor 104 controls the image capturing device 102 to capture images. If the actuator 112 is released before all configurations of the subset have been used the number of captured images may be less than the number of configurations of the subset. If the number of images captured exceeds the number of configurations of the subset, the processor 100 may reuse configurations. By way of example for the basic example given above, once one image has been captured using each of the three configurations a further image may be captured using the configuration {ISO=400, A=3.2, S=1/1000, F=on, FV=standard}, a further image may be captured using the configuration {ISO=400, A=3.2, S=1/1000, F=on, FV=high}, and a further image may be captured using the configuration {ISO=400, A=3.2, S=1/1000, F=on, FV=low}, etc.

The number of images and the number of configurations determined may also be based on the identified feature. For example, if it is determined that the view is a group-portrait a large number of configurations and images may be captured to increase the likelihood of obtaining a good capture of all faces.

In any case, after the image capturing sequence has been completed at least two images have been captured with the camera configured in accordance with at least two different configurations of the subset of configurations.

The captured images may be saved to the memory 206 as digital image files. The digital image files may be stored in any lossy or lossless image file format such as JPEG, TIFF, RAW etc. The user may then review the captured images using a display of the camera 100 or after downloading the captured images to a computer and then select his/her favorite shots and discard the rest, or optionally keep all shots.

Optionally, the camera 100 may also store one or more of the images recorded by the image capturing device 102 prior to detecting the image capture command (box 202). This may be implemented by providing one or more of the most recent images in the storage buffer of the image capturing device 102 to the memory 106 in response to detecting the image capture command. These images may also be provided to a viewfinder of the camera 100 (box 204). According to this option, the camera 100 will store images in the memory 106 captured both prior to the detection of the image capturing command and after detection of the image capturing command.

As mentioned above, the processor 104 may analyze the view by identifying one or more features of the view. More specifically, the processor 104 may analyze the view by identifying one or more features in the one or more images recorded by the image capturing device 102. The one or more features of the view may include an object or element in the view. Based on the one or more features, e.g. based on the type of object or element, the processor 104 may determine a subset of configurations for the camera 100 to be used during the image capture. More specifically, the processor 104 may determine at least one parameter to be varied. Preferably, the processor 104 determines at least one parameter, the setting of which is important for capturing an image including the identified feature(s). The parameter(s) may e.g. be determined using a look-up-table, wherein a column (or row) in the table may correspond to a certain feature which the processor 104 may identify and the rows (or columns) of the column (or row) indicates parameters which are important for capturing images including the identified feature. The processor 104 may further determine at least two settings for the at least one parameter. Preferably, the determination of the at least two settings is based on the identified feature(s). Thus, the subset of configurations may include at least two configurations, each configuration including a combination of specific settings of capture-related parameters of the camera 100.

The one or more features identified in the view may include a light condition in the view. The processor 104 may determine a brightness level in the one or more images recorded by the image capturing device 102. If there is strong light in the view, the processor 104 may determine a subset of configurations including a relatively large number of aperture settings. If there is strong light in the view, there may be sufficient light even for small apertures, i.e. large stop numbers. The user may thus benefit from being provided with images presenting many different depths of field. If there is comparably low light in the view (e.g. low-light indoor or night condition), the processor 104 may determine a subset of configurations including only one or more small aperture settings, a larger number of exposure times and a larger number of ISO settings. Optionally, the subset of configurations may also include configurations using flash of different strengths or no flash. The user may thus benefit from being provided with images presenting many exposure times, flash conditions, and different amounts of noise (i.e. for the different ISO settings). The user may thus be able to review the captured images and select one or images presenting an acceptable level of sharpness and image noise.

Optionally, the camera 100 may include a flash in the form of a LED light. A LED light does not require recharging. This enables a particularly efficient and simple implementation of capturing images at different flash strengths. More specifically, configurations including different settings of the flash strength may be determined. In response to the image capturing command images are captured using the configurations. During the image capturing the intensity of the flash is changed in accordance with the flash strength settings. The flash light may be lit also between the captures, i.e. without being turned off. The change of the flash light intensity may be monotonically increasing or decreasing. The change may be gradual or continuous. The images may be captured with the same exposure time and ISO setting. Thus a relatively large number of images may be quickly captured at different flash strengths.

The one or more features identified in the view may include a color content in the view. The processor 104 may determine a color content in the one or more images recorded by the image capturing device 102. The color content may e.g. be presence of a certain color in the images, or the most common or dominating color in the images. If a certain color is present, common or dominating in the view, the processor 104 may determine a subset of configurations including a relatively large number of different white balance, and/or color settings. For example, in an image including green as a major component it may be important or desirable to obtain the accurate nuance of green. By capturing a plurality of images using different settings of white balance and color settings, the likelihood of obtaining an image including an accurate rendition of green may be increased.

The one or more features identified in the view may include a contrast in the view. The processor 104 may determine a contrast level in the one or more images recorded by the image capturing device 102. The contrast level may be a local contrast or a global contrast of an image. The contrast may be determined using the Weber contrast definition, the Michelson contrast definition or the Root Mean Square (RMS) contrast definition. The determined contrast may include luminance contrast, brightness contrast and/or color contrast.

If there is high contrast in the view, the processor 104 may determine a subset of configurations including a relatively large number of different exposure values. For example, if the view includes both regions of high luminance and of low luminance there is a risk of, for a given exposure, either the high-luminance regions becoming over-exposed or the low-luminance regions becoming under-exposed. By capturing a plurality of images using different exposure values the likelihood of obtaining an image having an exposure level giving an acceptable exposure of both the high luminance regions and the low luminance regions may be increased.

The one or more features identified in the view may include the type of view depicted by the camera 100. The view may include a portrait. The portrait may be a group-portrait. The processor 104 may identify the presence of a face in the one or more images recorded by the image capturing device 102. If the view includes one or more faces, the processor 104 may determine a subset of configurations including both configurations using flash and configurations not using flash, and configurations including different flash strengths. The subset of configurations may additionally or alternatively include a relatively large number of different aperture settings in order to enable capturing of images wherein both the face and the background are sharp and images wherein the face but not the background is sharp. The subset of configurations may additionally or alternatively include a relatively large number of different white balance settings and/or color settings. Thereby, the likelihood of obtaining an image including an accurate rendition of the skin tone may be increased. The subset of configurations may additionally or alternatively include different settings of the focus point. Thereby, the likelihood of obtaining an image presenting a maximum sharpness at a desired part of the image may be increased.

The view depicted by the camera 100 may include a landscape or an urban environment. The processor may identify the presence of a landscape or an urban environment in the one or more images recorded by the image capturing device 102. If the view includes a landscape, the processor 104 may determine a subset of configurations including a relatively large number of different aperture settings in order to enable capturing of images wherein both the foreground and the background are sharp and images wherein the foreground but not the background is sharp. The subset of configurations may additionally or alternatively include both configurations using flash and configurations not using flash, and configurations including different flash strengths. Thereby, the likelihood of obtaining an image with a desired amount of fill flash may be increased. The subset of configurations may additionally or alternatively include a relatively large number of different settings of white balance and/or color settings. For a landscape, the configurations may emphasize the green and blue color levels. For an urban environment, the configurations may emphasize neutral color settings.

The view depicted by the camera 100 may include a moving object. The processor 104 may identify the presence of a moving object in the view by comparing subsequent ones of the images recorded by the image capturing device 102. If the view includes a moving object, the processor 104 may determine a subset of configurations including a relatively large number of different exposure times. Thereby different image effects may be obtained. For example both images wherein the movement of the moving object is frozen and images wherein the movement of the moving object is blurred may be obtained.

In the above, a few examples of features and subsets of configurations have been given as an aid in understanding the inventive concept. However, as may be understood there are further features, configurations and combinations thereof which are possible within the scope of the present inventive concept as set out in the claims.

The processor 104 may identify the one or more features of the view using various image analysis techniques. For example, the processor 104 may analyze an image in order to identify features such as color features, intensity features, structure features (e.g. persons, faces, man-made objects or natural objects in the image) of the image. The image may include color information coded using any color space known in the art, such as the RGB-space, the YUV-space, the HSV-space etc. Image features may be identified and the result may be recorded in a feature vector. One or more features of the image may be analyzed. The result for each type of feature may be recorded in a separate feature vector. To reduce the memory and processing requirements of the method a scaled-down version of the image to be analyzed may be generated, wherein features may be identified in the scaled-down image.

One example of a feature vector is a histogram of the pixel intensities in the image. The histogram may include a plurality of bins, each bin including the number of pixels of the image of a certain intensity value. Color features may be extracted and represented in color histograms. A separate color histogram may be formed for each color channel of the image. The color histograms for the channels may then be concatenated to form a color feature vector. The amount of quantization (i.e. the number of bins) may be varied depending on the specific application, and the processing and memory requirements available. Color features may also be analyzed by forming a color coherence vector which also takes the spatial arrangement of the colors in the image into account.

Various methods for extracting structure features exist. A structure feature extraction may optionally be preceded by a decolorization step, wherein a grayscale representation of the image is formed. This may simplify the extraction. The decolorization may be achieved e.g. by discarding the hue and saturation color information and only keeping luminance information.

Structure features may be extracted in the following way: An image is filtered by a set of Gabor filters with different orientations and scales. The different orientations of the filters will result in filter responses that are correlated to the structural features in the image with a similar orientation. For example, a vertical frequency filter may give a strong response for the vertical edges of a tall building in an urban environment whereas a horizontal frequency filter may give a strong response for the horizontal line in a landscape image. The responses for each filter may be divided into 4×4 blocks. For each block the response is stored in a feature vector. A composite structure feature vector of length 4*4*{number of filters} may be formed by concatenating the feature vectors for each block and filter. This method is based on the GIST-method described in Modeling the shape of the scene: A holistic representation of the spatial envelope, by Aude Oliva and Antonio Torralba, International Journal of Computer Vision 42(3), 145-175.

Another example of a method for structural feature extraction is the Local binary pattern method. A detailed description of the method may be found in Multiresolution grayscale and rotation invariant texture classification with local binary patterns, by Timo Ojala, Matti Pietikäinen and Topi Maäenpää, published in IEEE Transactions on pattern analysis and machine intelligence, vol. 24, no. 7, July 2002.

The intensity value (0-255) of a pixel may be compared to the intensity values of the eight neighboring pixels of said pixel. If a neighboring pixel has an intensity value greater than the intensity value of the chosen pixel, a "1" is recorded. Conversely, if the neighboring pixel has a smaller value a "0" is recorded. A binary pattern for the chosen pixel may then created by selecting one of the neighbors as the most significant bit of an 8-bit number and setting the other bits by traversing the neighbors clockwise. The largest possible 8-bit number may be chosen as the binary pattern for the chosen pixel. The 8-bit number may be recorded in a 256-bin histogram. As an example, in case the "11111111"-bin (i.e. the "256"-bin) has a large magnitude this may indicate that the image has large homogeneous areas and thus may be considered a smooth image. The "256"-bin records pixels which only have neighbors with an intensity value greater than or equal to the intensity value of the pixel. This may be repeated for all or a subset of the pixels of the image.

To reduce the memory and processing requirements of the feature identification, once a feature vector has been formed, the length of the feature vector may be reduced. This may be achieved e.g. by Principal Component Analysis (PCA) or the discrete Karhunen-Loève transform. The PCA results in a set of orthogonal eigenvectors. Eigenvectors having smaller eigenvalues may be discarded and the original feature vector may be projected to the larger remaining eigenvectors wherein a feature vector of reduced dimensionality may be obtained.

The determined feature vector(s) of the image to be classified may be input to a classifier for determining or predicting the type of view depicted in the image. The classification may include comparing the image to be classified with a set of reference images or an average feature vector determined from a plurality of reference images. The set of reference images may include a plurality of classified images of different types (e.g. portraits, group portraits, landscapes, urban environments etc). The distance between the feature vector of the image to be classified (hereinafter the "test image") and corresponding feature vectors determined for at least some of the images of the set of reference images may be calculated. The class of the test image may then be determined as the class of the reference images being "closest" to the test image, e.g. using the 2-norm, i.e. the Euclidian distance. Alternatively, histogram feature vectors may be compared by calculating the diffusion distance. The diffusion distance concept is described in detail in Diffusion distance for histogram comparison by Kazunori Okada and Haibin Ling, IEEE Computer Society Conference on Computer Vision and Pattern Recognition, Issue Date: 17-22 Jun. 2006, pages 246-253.

Another method which may be used to identify features, and especially human or portrait features, is disclosed in US2009190803A. According to US2009190803A an analysis of a digital image determines whether or not a smile and/or blink is present on a face of a human being. Thus, the feature recognition may relate to recognition of a human person and optionally also to the recognition of a human face and features thereof such as a human mouth, a human eye and/or recognition of facial expressions.

Once a set of images has been captured, they may be used in various ways. According to one embodiment the images captured in box 212 may be stored in a data structure representing an image sequence (box 214). In case also images captured prior to the detection of the image capturing command are to be stored, these may also be included in the image sequence. As one example the data structure may be a composite image including (possibly scaled versions) of the captured images arranged in rows and columns. The composite image may thereby resemble a contact sheet. As another example the data structure may be a video file wherein the captured images are used to form a video stream. For example the video file may be a slide show including the captured images.

According to one embodiment the processor 104 may analyze the captured images using a set of criteria in order to automatically determine or single out one or more of the images captured in box 212 (box 216). The set of criteria may include one or more criteria relating to image quality such as image sharpness, image contrast, dynamic range and noise level etc using appropriate image analysis techniques known in the art. Alternatively or additionally the set of criteria may include a facial quality, such as no closed eyes, the presence of a smile, image sharpness in a region containing a face, etc. Such criteria may be evaluated using the techniques described below. The camera 100 may indicate to the user the image or images which have been selected e.g. by presenting them on a display of the camera 100. The processor 104 may also be configured to discard all of the captured images except for the selected image(s) (box 218).

According to one embodiment the processor 104 may analyze the captured images using a set of criteria in order to automatically determine or single out two or more of the images captured in box 212 (box 220). The selected images may then be used to form a composite image (box 222).

The images may be selected and combined in order to form a composite image presenting a high dynamic range, i.e. an HDR image. The set of criteria may include one criteria being that a first image has been captured using a lower exposure value setting and one criteria being that a second image has been captured using a higher exposure value setting. As another example, the first image may have been captured using a flash level being higher than the flash level used when capturing the second image. Thus a composite image presenting an increased dynamic range may be formed. The processor 104 may be configured to perform this operation automatically after the images have been captured. Alternatively, the function may be available through a menu option in the camera 100 wherein the user may create an HDR image on demand.

The images may also be selected in order to form a composite image including parts of the selected images. More specifically, a source image and a target image may be determined or selected from the captured images. A source area may be identified in the source image, the source area having a set of coordinates. A target area in the target image may then be identified using the set of coordinates for the source area. A composite image including image data information of the first image may then be formed, wherein image data information of the target area of the target image is seamlessly replaced with image data information of the source area. Alternatively, image data information of the source area of the source image may be seamlessly replaced with image data information of the target area. The above-mentioned acts, as well as the following acts, may be implemented, i.e. performed, by the processor 104.

Various combinations of source and target images may be selected. Moreover the source and target areas may include various different contents. As one example, an area of the source image may be "in focus" whilst a corresponding area in the target image is "out of focus", or vice versa. Thereby an "out of focus" area may be seamlessly replaced with an "in focus" area. As another example, the level of blur in an area of the source image may be lower than the level of blur for a corresponding area in the target image, or vice versa. Thereby a blurry area may be seamlessly replaced with a less blurry area. As another example, the source image may have been captured using a flash level being higher than the flash level used when capturing the target image, or vice versa. A high flash level may be desired for some areas in the scene to be captured but may at the same time result in other areas in the images being overexposed. Overexposed areas may thus be seamlessly replaced with corresponding areas from another image captured using a lower flash level or no flash at all. As another example, an area of an image depicting human beings with closed eyes may be replaced with a corresponding area from another (similar) image wherein the eyes of the (same) human being is open, inter alia by allowing a user to replace parts of an image with the same area from other images.

The source image may be manually selected by the user, e.g. via the MMI 110. Alternatively, the processor 104 may select the source image from the captured images using a set of criteria. The set of criteria may relate to the presence of a certain feature (e.g. object or element) in the image, as the image having the smallest blur, the highest dynamic range and/or the largest contrast, etc.

The source area may have a set of coordinates. The set of coordinates may define the location of the source area in the source image. For example, the set of coordinates may comprise coordinates defining the location of corners and/or sides of a rectangle in the source image, the set of coordinates may comprise coordinates defining the area and location of a circle in the source image, and the like.

The source area may be identified based on a received signal identifying the source area. The received signal may be generated from user input received via the MMI 110 of the camera 100. Thereby a user may be allowed to manually identify and select an area or an object (see below) in the source image via the MMI 110. The source image may be displayed on a display of the MMI 110. In case the MMI 110 comprises a touch sensitive display the user may identify the source area by drawing a line enclosing the source area, or otherwise mark its coordinates. The MMI 110 may also provide a tool facilitating the identification of the source area. The tool may comprise predetermined geometrical objects (such as rectangles, squares, circles, and ellipses) which, via user input, could be used to identify the source area.

The source area may also be identified using feature recognition. The source are may be identified as the area of the source image including the above-mentioned feature (e.g. object or element). The use of such feature recognition may eliminate, or at least reduce, the need to receive user input in order to identify the source area. Hence the method may comprise receiving feature information relating to a feature of at least one of said source image and said target image, wherein at least one of said source area and said target area comprises said feature; and identifying said source area based on said feature. For example, and as described above, a feature recognition may relate to recognition of a human person. The feature recognition may relate to recognition of a human face. The feature recognition may relate to recognition of a human mouth. The feature recognition may relate to recognition of a human eye. The feature recognition may relate to recognition of facial expressions of a human being. Either the source image or the target image, or both the source image and the target image may comprise the feature. The source area may then be identified by using the feature.

The target image may be manually selected by the user, e.g. via the MMI 110. Alternatively, the processor 104 may select the target image from the captured images using a set of criteria. The set of criteria may relate to the presence of a certain feature (e.g. object or element) in the image, as the image having the smallest blur, the highest dynamic range and/or the largest contrast, etc. Especially, the feature may be a feature present also in the (source area) of the source image.

In response to identifying the source area, the target area in the target image may be identified. The geometrics of the target area may be based on the geometrics of the source area. In particular, the set of coordinates for the source area may be used such that a set of coordinates for the target area in the target image corresponds to the set of coordinates for the source area. The set of coordinates for the target area defines the location of the target area in the target image. The set of coordinates for the target area may further define the area (in spatial terms) of the target area in the target image.

The target area in the target image may be identified by determining an error function between the source area and the target area. The error function may be determined over a set of sample points in an area S along a preliminary cut $d\Omega$ between the source area and the target area for zero translation. The preliminary cut may then be translated outwards from the zero translation until the error function is minimized. The error function may thereby be used to determine the target area in the target image. The translation outwards may be performed along a spiral formed trajectory.

To be able to find a suitable cut (see below) it may beneficial to align the source image and the target image along a preliminary cut boundary. This may be accomplished by minimizing an error function, for example by minimizing $E(r) = \Sigma_{v\ in\ d\Omega} [I_{si}(v+r) - I_{ti}(v)]^2$ along the preliminary cut $d\Omega$ over a suitably large section S. $I_{si}$ and $I_{ti}$ denote the source image and target image intensities, respectively. For a color image the intensities may be calculated as $I=(R+G+B)/3$, where R, G and B are the red, green and blue color channels respectively, alternatively one may use a luminance channel of a YUV image. The size of the area S may be dependent on the amount of movements between the source image and the target image. It may further be dependent on the time passed between the capturing of the source image and the target image.

There may be different approaches how to minimize the error function, for example by using convolution and fast Fourier transforms. A convolution based method may be fast for calculating the entire error function. It has been discovered that since each term in the sum in the error function is positive it would follow that, while searching for the global minima, a point whose partial sum exceeds that of the current minima could not be a global minima. It would also follow that if the global minimum is encountered early, more sums could be ended prematurely, thus saving computations. It could therefore be a beneficial to calculate the error function over a few points in a small area around zero translation and then extend the search area outwards. This may be motivated by the assumption that a translation movement occurring between the capture of the source and target image generally may be considered as normally distributed.

Figure 4A:
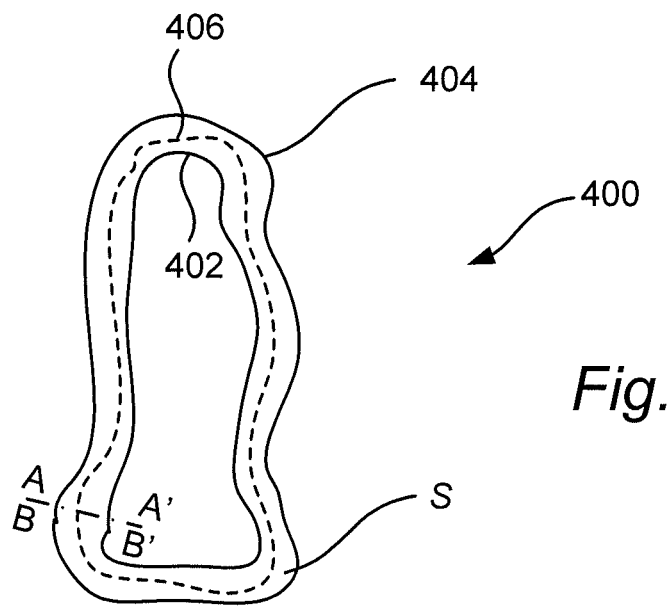
FIG. 4 schematically illustrates a cut operation according to an embodiment.
Figure 4B:
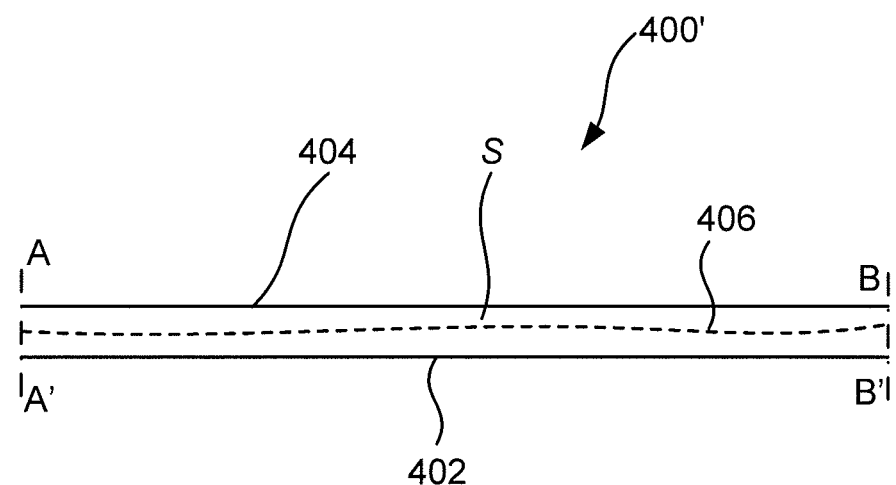

A suitable boundary inside which the source image is to be inserted may be determined. The determined boundary represents a cut. The cut may thus define the intersection between the target image and the source image. For illustrative purposes the source image may be regarded as placed on top of the target image wherein the source image (or target image) has been translated as previously described. Inner and outer boundaries defining a section (corresponding to the above disclosed area S) within which the (desired) boundary is constrained may be specified. FIG. 4a illustrates a boundary region 400 having an inner boundary 402 and an outer boundary 404 and a desired boundary 406. An error function, which considers the squared pixel wise difference between the source image and the target image at pixels within the section, is defined. FIG. 4b is a corridor graph representation 400' of the boundary region 400 of FIG. 4b, wherein the boundary region 400 has been opened along the intersection A-A'-B-B'. The cut may be found by assigning each pixel in the area S with a cost and then finding a closed path in the area S which minimizes the cost. An optimal solution is provided in the paper "Shortest circular paths on planar graphs" in 27th Symposium on Information Theory in the Benelux, vol. p. 117-124, June 2006, Noordwijk, Netherlands by Farin et al. When representing the pixels with a graph, such as the corridor graph 400', the graph has a trellis structure. The graph associated with the area S may thus be represented as a trellis and hence dynamic programming may be used instead of Dijkstra's algorithm. Thus a tail-biting path (i.e. a path in the corridor graph 400' beginning and ending in pixels yielding an enclosed boundary 406 in the corresponding boundary region 400) with a minimum error of all paths or a path with an error below a predetermined threshold may then be found within the section S. The thus found cut defines the cropping of the source image and the target image.

The composite image may be formed (box 222) based on image data information of the target image wherein image data information of the target area is seamlessly replaced with image data information of the source area. Correspondingly the digital image may be based on the source image wherein image data information of the source area is seamlessly replaced with image data information of the target area.

Feature recognition may be used to determine whether or not one of the source area and the target area fulfills a condition relating to the feature information. The digital image may then be formed based on this determining. For example, wherein, in a case the source area fulfills the condition, the image data information of the target area may be seamlessly replaced with the image data information of the source area. For example, wherein, in a case the target area fulfills the condition, the image data information of the source area may be seamlessly replaced with the image data information of the target area.

Particularly, in case feature information relates to a facial expression, and one of the source image and the target is classified as comprising a smiling face the image may be formed to include the smiling face. In order to achieve this facial detection may be used. When a face has been detected smile detection may be used by detecting the lips of the thus recognized face and classifying the detected lips, inter alia depending on their curvature, into at least two categories, such as smiling lips or non-smiling lips. A similar classification may be performed to detect blinking eyes or red eyes (inter alia caused by flash effects during capture of the image comprising the red eyes). The method may thus, further comprising identifying a facial expression to be used when forming the digital image. Thereby "sad" faces may be replaced with "happy" faces, wherein the "sad" faces are associated with non-smiling lips and "happy" faces are associated with smiling lips.

The composite image may be formed by blending the source image and the target image. A gradient-domain-like blending may be applied to ensure that the insertion of the source area into the target image (or vice versa) is seamless. In more detail, when (an area from) a source image is to be blended into a target image (or vice versa), the boundary of the source image should at least approximately equal the boundary of the target image. This may require the source image and/or target image to be manipulated in some way. Advantageously the manipulation should only impose gradual changes on the interior of the source image in order to be as visually undetectable as possible. One example which accomplishes the desired effect is Poisson blending. More specifically the gradient field of the source image may be modified in such a way as to find the source image which has a gradient field that is closest (in L2-norm sense) to the target image.

Figure 3:
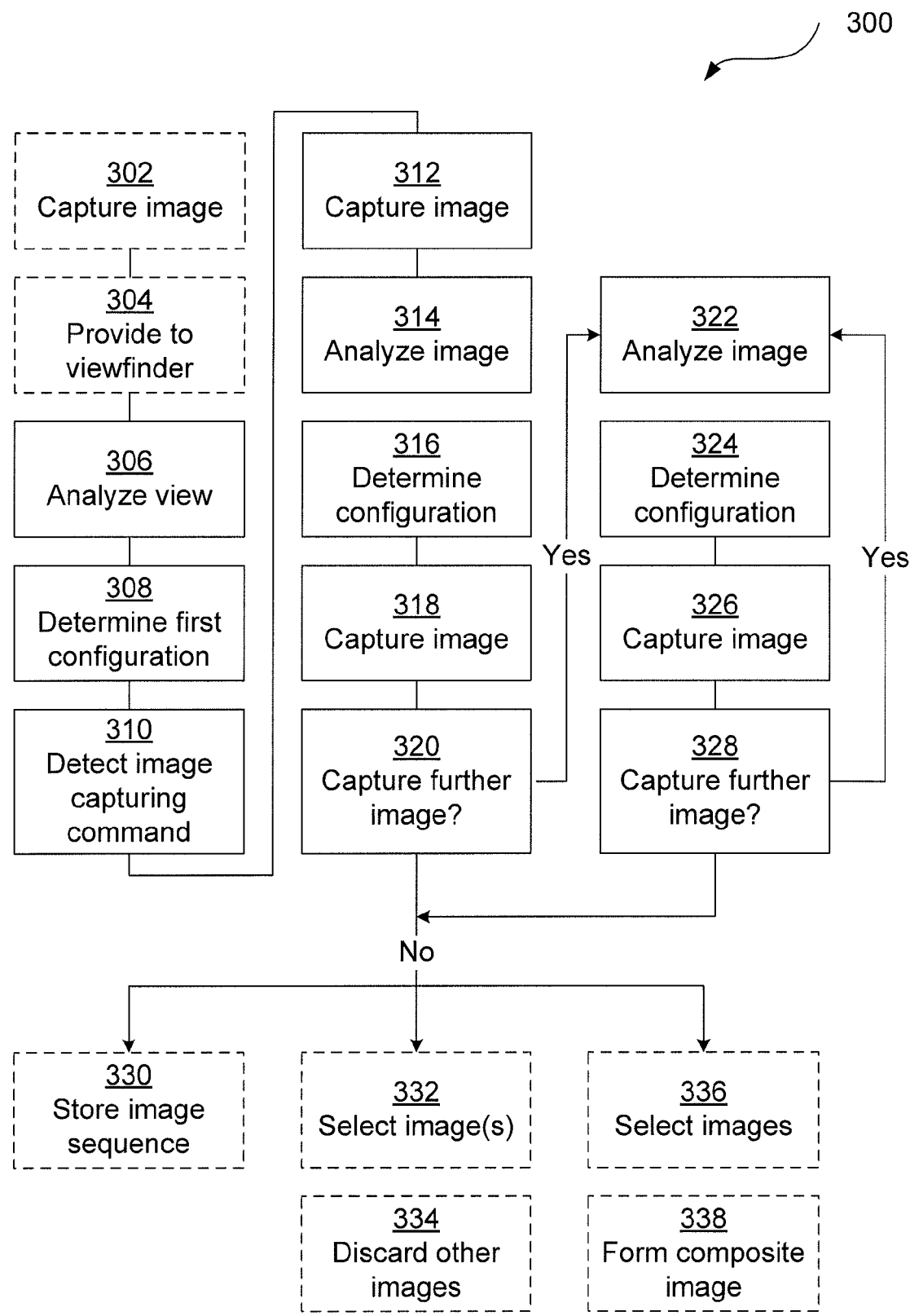
FIG. 3 is a flow chart of an embodiment of a method in accordance with a second aspect of the present inventive concept.

An embodiment of a method 300 in accordance with a second aspect will now be described with reference to FIGS. 1 and 3. According to the method 200, a set of configurations is determined prior to detecting the image capturing command or in response thereto. The method 300 is similar to the method 200 however differs in that configurations of the camera 100 are determined successively, during image capturing, i.e. the image capturing act.

More specifically, the method 300 comprises analyzing a view depicted by the camera 100 (box 306). The analyzing may comprise identifying at least one feature of the view. This corresponds to box 206 of the method 200 wherefore reference is made to the above discussion. Based on the analysis, the processor 104 determines a first configuration of the camera 100 (308). The first configuration may be a configuration of the camera 100 which is suitable for capturing a first image. The first configuration may correspond to the base configuration discussed in connection with the method 200.

Once the user has directed the camera 100 towards the desired view the user issues an image capturing command. The image capturing command is detected by the camera 100 (box 310). As discussed above, the user may e.g. press the actuator 112 of the camera 100 once, reduce the movement of the camera 100, or the user may speak an audible capturing command into the microphone which command may be interpreted and recognized by the processor 104 as an image capturing command.

In response to the detection of the image capturing command the processor 104 controls the image capturing device 102 of the camera 100 to capture an image using the first configuration determined by the processor 104 (box 312). The first image may be transferred to the memory 106 immediately after it has been captured. Alternatively, the first image may be kept in the storage buffer of the image capturing device 102 and transferred to the memory 106 after all images have been captured, i.e. at the end of the method 300.

In response to capturing the first image, the processor 104 may analyze the first image (box 314). The analysis may include identifying at least one feature of the first image. The analysis may be performed in analogously to the above description. Correspondingly, the at least one identified feature may be any of the above-discussed features. The first image may be provided to the processor 104 from the storage buffer of the image capturing device or, if the first image has been transferred thereto, from the memory 106.

Based on the analysis of the first image the processor may determine a second configuration of the camera 100 (box 316). The second configuration may include a setting of a parameter which is different from a setting of the same parameter of the first configuration. The second configuration may further include a setting of a further parameter which is different from a setting of the same parameter of the first configuration. The parameter(s) for which the setting is changed may be determined during the act of analyzing the view (box 306). Thus, the processor 104 determines, based on the analysis of the view, a first configuration and one or more parameters for which the settings are to be varied. For example, if the identified feature includes a portrait, the processor 104 may determine the first configuration and further determine that the settings of the parameter(s) flash, flash strength, white balance and/or color rendering are to be varied. The processor 104 may then analyze the first image to determine the actual setting(s) of these parameters and thus determine the second configuration. Alternatively, the parameter(s) for which the setting is changed as well as the actual setting(s) may be determined during the act of analyzing the view.

The method 300 proceeds in box 318 with the processor 104 controlling the image capturing device 102 of the camera 100 to capture a second image using the second configuration determined by the processor 104. The second image may be captured in response to the processor 104 determining the second configuration. The second image may be transferred to the memory 106 immediately after it has been captured. Alternatively, the second image may be kept in the storage buffer of the image capturing device 102 and transferred to the memory 106 after all images have been captured, i.e. at the end of the method 300.

Optionally, more than one configuration may be determined in box 316. For example, the processor 104 may determine at least two configurations in box 316, wherein the camera 100 may capture at least two images using at least two different configurations of the at least two configurations determined in box 316 and thus proceed in accordance with the method 200 of the first embodiment.

Returning to FIG. 3, in box 320 it is determined whether further images are to be captured. The determination may be based on whether a desired number of images have been captured. The processor 104 may for example count the number of captured images and compare the number with a threshold number. If the number of captured images falls below the threshold number it may be determined that further images are to be captured wherein the method 300 may proceed to box 322. If the number of captured images equals or exceeds the threshold number it may be determined that no further images are to be captured.

Alternatively the determination may be based on whether there has been a change in the view since the capture of the first image or second image. The change may be the result of the user having changed the direction since the capture of the first (or second) image. It may also be the result of the objects in the view changing position. The change may be determined by comparing the first (or second) captured image to the more recently captured image. The comparison may be based on a pixel-by-pixel or sub block-by-sub block basis. The comparison may be performed by correlating the first (or second) captured image with the more recently captured image. If the change exceeds a threshold, it may be determined that no further images are to be captured. Otherwise, it may be determined that further images are to be captured wherein the method 300 may proceed to box 322.

The captured images may be stored in a circular buffer. The circular buffer may have a predetermined size. As an example, the circular buffer may have a storage capacity of 10 images, 20 images, 30 images or more. Once the buffer has been filled the images are sequentially replaced by more recently captured images, starting from the oldest image stored in the buffer.

In response to determining that a further image is to be captured, the processor 104 may analyze the second captured image (box 322). Based on the analysis the analysis the processor 104 may determine a third configuration of the camera 100 (box 324). The third configuration may include a setting of a parameter which is different from a setting of the same parameter of the first configuration and the second configuration.

The method 300 proceeds in box 326 with the processor 104 controlling the image capturing device 102 of the camera 100 to capture a third image using the third configuration determined by the processor 104. The third image may be captured in response to the processor 104 determining the third configuration.

The method 300 proceeds in box 328 with determining whether further images are to be captured. If it is determined that further images are to be captured the method 300 returns to step 322 wherein the third captured image may be analyzed. A fourth configuration may be determined as described above wherein a fourth image may be captured using the fourth configuration. This process may repeat until it is determined that no further images are to be captured. The details and the options described in connection with box 314-320 apply analogously to box 322-328.

If no further images are to be captured the method 300 may proceed according to boxes 330-338 which correspond to boxes 214-222 of method 200 wherein reference is made to the above-discussion.

Optionally, the method 300 may further comprise storing one or more of the images recorded by the image capturing device 102 prior to detecting the image capture command (box 302). These images may also be provided to the viewfinder of the camera 100 (box 304). The description provided above in connection with boxes 202-204 applies analogously to boxes 302-304 wherein reference is made to the above discussion.

In the above image capturing methods have been described wherein subsets of configurations are determined based on analysis of the view depicted by the camera. However, the determination need not be limited to an analysis of the depicted view but may more generally be based on analysis of a capturing condition. According to this more general approach there is provided a method of capturing images using a camera comprising: analyzing a capturing condition; determining, based on the analysis, a subset of configurations of the digital camera; and capturing, in response to a detection of an image capturing command at the camera, a set of at least two images using at least two different configurations of the subset of configurations.

The capturing condition may include a time of day. The camera 100 may include a clock. The clock may be connected to the processor 104. The processor 104 may determine the time of day. The processor 104 may determine a subset of configurations based on the time of day.

The capturing condition may include a geographical position of the camera 100. The camera 100 may include a positional unit such as a GPS. The positional unit may be connected to the processor 104. The processor 104 may receive the geographical position of the camera 100 from the positional unit. The processor 104 may determine a subset of configurations based on the position.

The capturing condition may include an orientation of the camera 100. The camera 100 may be in a portrait or a landscape orientation. The camera 100 may include an orientation determination unit such as a gyroscope. The orientation determination unit may be connected to the processor 104. The processor 104 may receive orientation data from the orientation determination unit. The processor 104 may determine a subset of configurations based on the orientation.

The capturing condition may include a sound condition. The camera 100 may include a MIC 114. The processor 104 may analyze the sound recorded by the MIC 114 and determine a sound condition. The sound condition may include the presence of a certain sound such as the sound of laughter, the sound of running water, the sound of breaking waves, the sound of an engine, the sound of the wind etc. Based on the sound condition a subset of configurations may be determined. The processor 104 may analyze the sound by determining a spectrum of the sound (e.g. using DCT or FFT). The processor 104 may compare the determined spectrum to one or more reference spectrums being associated with a certain sound condition. A sound condition may be determined if the determined spectrum corresponds to or matches a reference spectrum. The processor 104 may determine a subset of configurations based on the sound condition.

The capturing condition may include a movement condition of the camera 100. The camera 100 may include a movement sensor such as an accelerometer. The movement sensor may be connected to the processor 104. The processor 104 may receive movement data from the movement sensor. Alternatively, the processor 104 may determine a movement condition by repeatedly comparing at least the two latest images recorded in the storage buffer of the image capturing device 102. The movement condition may include that the camera 100 is not moving, that a movement of the camera 100 is started, that a movement of the camera 100 is decreasing or is ended, that the camera 100 is moved in a certain direction, that a rate of the movement falls below a threshold or exceeds a threshold, etc. The processor 104 may determine a subset of configurations based on the movement condition.

The capturing condition may include a type of image capturing command being input. For example, the subset of configurations may be determined based on whether the image capturing command is received via the actuator 112 of the camera 100, via a reduced movement of the camera 100, or via the MIC 114 of the camera. The camera 100 may include additional actuators 112 wherein the subset of configurations may be determined based on which actuator 112 is used. The analysis of the capturing condition may include analyzing the view depicted by the camera 100. As previously described, the analysis of the view may include identifying a feature of the view and based on the identified feature determine a subset of configurations.

Consequently, different subsets of configurations may be determined for different capturing conditions. This is advantageous since different capturing conditions may benefit from completely different settings of the various parameters of the camera 100.

In the above the invention has mainly been described with reference to a limited number of examples. However, as is readily appreciated by a person skilled in the art, other examples than the ones disclosed above are equally possible within the scope of the invention, as defined by the appended claims.

The invention claimed is:

1. A method of capturing images using a camera comprising:
    at a processor analyzing a view depicted by the camera;
    at said processor determining based on said analysis, a first configuration of the camera;
    capturing, in response to a detection of an image capturing command at the camera, at least two images using at least two different configurations of the camera;
    wherein a first image is captured using the first configuration of the camera; and wherein a second image is captured automatically using a second configuration in response to analysis of the first image, wherein the second configuration is determined based on analysis of the first image captured by the camera;
    at the camera selecting a source image from the at least two images:
    at the camera identifying a source area within the source image;
    at the camera, identifying a target image selected from the at least two images, wherein the target image is an image selected by the processor based on a set of criteria in response to the source area of the source image being identified;
    at the camera identifying a target area from the target image, wherein the target area is identified based on a location of the source area within the source image; and
    at said processor replacing the source area with the target area from the target image to form a composite image.

2. A method of capturing images using a camera according to claim 1 wherein the analysing of a view includes identifying at least one feature of the view.

3. A method of capturing images using a camera according to claim 1 further comprising capturing, prior to detecting the image capturing command, at least one image of said view.

4. A method of capturing images according to claim 1 wherein the identifying of a source area is done using a user interface.

5. A method according to claim 1 wherein a configuration comprises a camera related parameter and the camera related parameter includes at least one of: aperture, exposure time, exposure value, ISO, flash usage, flash strength, flash synchronization speed, colour settings, white balance, or focus point.

6. A camera comprising;
    a processor configured for analysing a view depicted by a camera and based on said analysing determining a subset of configurations of said camera;
    an image sensor configured to capture a plurality of images in response to an image capture command, at least two images using at least two different configurations of said camera;

wherein a first image is captured using the first configuration of the camera; and wherein a second image is automatically captured using a second configuration in response to analysis of the first image, wherein the second configuration is determined based on analysis of the first image captured by the camera;

a memory configured to store a plurality of images;

a display configured to present a source image from the plurality of images;

said processor configured for selecting a source area within the source image;

said processor configured for selecting a target image from the plurality of images based on a set of criteria in response to the source area of the source image being selected, and replacing the source area with a target area from the target image to form a composite image, wherein the target area is identified based on a location of the source area within the source image.

7. A camera according to claim 6 configured to capture at least one image of said view prior to detecting the image capturing command.

8. A camera according to claim 7 wherein the processor is configured to determine further configurations based on the at least one image.

9. A camera according to claim 8 wherein the further configuration comprise a camera related parameter which contains at least one of: aperture, exposure time, exposure value, ISO, flash usage, flash strength, flash synchronization speed, colour settings, white balance, or focus point.

10. A camera according to claim 6 wherein the processor is configured to identify the target area based on a coordinate location of the source area or a common feature in the source image and target image.

11. A camera according to claim 10 wherein the set of criteria include one or more criteria relating to image quality, such as; image sharpness, image contrast, dynamic range, or noise level.

12. A camera according to claim 10 wherein the set of criteria is a facial quality comprising at least one of: no closed eyes, the presence of a smile, and image sharpness in a region containing a face.

13. A camera according to claim 6 wherein a configuration is determined prior to capturing a plurality of images.

14. A camera according to claim 6 wherein a configuration comprises a camera related parameter which contains at least one of: aperture, exposure time, exposure value, ISO, flash usage, flash strength, flash synchronization speed, colour settings, white balance, or focus point.

15. A camera according to claim 6 wherein the processor is configured to identify at least one feature of said view during said act of analysing, said one feature including at least one of a light condition in the view, a color content of the view, or a type of the view depicted, such as a portrait, a group-portrait, a landscape, an urban environment or a moving object.

16. A camera according to claim 6 wherein the display is configured to show viewfinder images of the view, said viewfinder images being of lower than maximum quality and/or resolution supported by the image capturing device.

17. A camera according to claims 6 wherein the plurality of images are stored in the memory as an image sequence.

18. A camera comprising;
   a processor configured for analysing a capturing condition of the camera and based on said analysing determining a subset of configurations of said camera;
   an image sensor configured to capture a plurality of images in response to an image capture command, at least two images using at least two different configurations of said camera;
   wherein a first image is automatically captured using the first configuration of the camera; and wherein a second image is captured using a second configuration in response to analysis of the first image, wherein the second configuration is determined based on analysis of the first image captured by the camera;
   a memory configured to store a plurality of images;
   a display configured to present a source image from the plurality of images;
   said processor configured for selecting a source area within the source image;
   said processor configured for selecting a target image from the plurality of images based on a set of criteria in response to the source area of the source image being selected; and
   replacing the source area with a target area from the target image to form a composite image, wherein the target area is identified based on a location of the source area within the source image.

19. A camera according to claim 18 wherein the capturing condition is any one of: a time of day, a geographical location of the camera, an orientation of the camera, a sound received by the camera, or a movement condition of the camera.

* * * * *